United States Patent
Narita

(10) Patent No.: US 9,751,493 B2
(45) Date of Patent: Sep. 5, 2017

(54) VEHICLE POP-UP HOOD DEVICE

(71) Applicant: TOYOTA JIDOSHA KABUSHIKI KAISHA, Toyota-shi, Aichi-ken (JP)

(72) Inventor: Sotaro Narita, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/232,392

(22) Filed: Aug. 9, 2016

(65) Prior Publication Data

US 2017/0050610 A1 Feb. 23, 2017

(30) Foreign Application Priority Data

Aug. 21, 2015 (JP) .................................. 2015-164086

(51) Int. Cl.
*B60R 21/38* (2011.01)
*B62D 25/12* (2006.01)

(52) U.S. Cl.
CPC .............. *B60R 21/38* (2013.01); *B62D 25/12* (2013.01)

(58) Field of Classification Search
CPC .................................. B60R 21/38; B62D 25/12
See application file for complete search history.

(56) References Cited

U.S. PATENT DOCUMENTS

| 8,311,701 | B2* | 11/2012 | Iwai | B60R 21/38 180/69.23 |
|---|---|---|---|---|
| 8,768,574 | B1* | 7/2014 | Shaw | B60R 21/38 180/274 |
| 2008/0189015 | A1* | 8/2008 | Borg | B62D 25/12 701/45 |
| 2015/0060180 | A1* | 3/2015 | Yang | B60R 21/38 180/274 |
| 2016/0245003 | A1* | 8/2016 | McIntyre | B60R 21/38 |
| 2017/0057458 | A1* | 3/2017 | Narita | B62D 25/12 |

FOREIGN PATENT DOCUMENTS

| JP | 2009-202871 A | 9/2009 |
|---|---|---|
| JP | 2015-042530 A | 3/2015 |

* cited by examiner

*Primary Examiner* — Drew J Brown
(74) *Attorney, Agent, or Firm* — Oliff PLC

(57) ABSTRACT

A vehicle pop-up hood device includes a hinge base, a first arm that is coupled to the hinge base via first pin, a second arm that is coupled to the first arm via a second pin, and an actuator that is coupled to the first arm via a first coupling shaft and coupled to the second arm via a second coupling shaft. The first coupling shaft, the second coupling shaft, and the second pin are disposed at a vehicle front side and a vehicle width direction inner side with respect to the first pin. The actuator is disposed at an incline toward the vehicle width direction inner side on progression toward the vehicle front side in vehicle plan view, and respective axial lines of the first coupling shaft, the second coupling shaft, and the second pin are orthogonal to the actuator in vehicle plan view.

3 Claims, 11 Drawing Sheets

VEHICLE POP-UP HOOD DEVICE

CROSS-REFERENCE TO RELATED APPLICATION

This application claims priority under 35 USC 119 from Japanese Patent Application No. 2015-164086 filed Aug. 21, 2015, the disclosure of which is incorporated by reference herein.

BACKGROUND

Technical Field

Technology disclosed herein relates to a vehicle pop-up hood device.

Related Art

A vehicle pop-up hood device described in Japanese Patent Application Laid-Open (JP-A) No. 2009-202871 is configured including a fixing member (second arm) fixed to a hood, a second hinge portion (hinge base) fixed to a vehicle body, and a swing member (first arm) that couples the second hinge portion and the fixing member together. The swing member is provided with a piston cylinder unit (actuator), and a piston of the piston cylinder unit is coupled to the fixing member. When the piston cylinder unit is actuated, the piston pushes up (lifts) the fixing member (second arm) to dispose the hood at a pushed up position (lifted position).

However, in this vehicle pop-up hood device, the swing member (first arm) and the fixing member (second arm) are disposed offset in the vehicle width direction with respect to the second hinge portion (hinge base). Accordingly, during actuation of the piston cylinder unit (actuator), actuation load from the piston cylinder unit (actuator) could cause flexural deformation of the swing member (first arm) in the vehicle width direction. In particular, if the offset amount is large, the flexural deformation of the swing member (first arm) becomes large, and there is a possibility of not being able to push up (lift) the hood as desired.

An exemplary embodiment of the present invention provides a vehicle pop-up hood device capable of lifting a hood as desired.

SUMMARY

A vehicle pop-up hood device according to a first aspect of the present invention includes: a hinge base that is fixed to a vehicle body; a first arm that is disposed at a vehicle width direction inner side of the hinge base, and that is coupled to the hinge base, so as to be capable of swinging, via a first pin having an axial direction in the vehicle width direction; a second arm that is disposed at the vehicle width direction inner side of the first arm, that is fixed to a vehicle width direction outer side end portion of a rear section of a hood, that is coupled to the first arm via a second pin so as to be capable of swinging, and that moves the vehicle width direction outer side end portion of the rear section of the hood toward a vehicle upper side by swinging with respect to the first arm; and an actuator that is coupled to the first arm via a first coupling shaft and that is coupled to the second arm via a second coupling shaft disposed at a vehicle rear side of the first coupling shaft, actuation of the actuator causing the second arm to be swung with respect to the first arm, whereby the hood is lifted from a closed position to a lifted position, wherein: the first coupling shaft, the second coupling shaft, and the second pin are disposed at a vehicle front side and at the vehicle width direction inner side with respect to the first pin, and the actuator is disposed at an incline toward the vehicle width direction inner side on progression toward the vehicle front side in vehicle plan view, and respective axial lines of the first coupling shaft, the second coupling shaft, and the second pin are orthogonal to the actuator in vehicle plan view.

In the vehicle pop-up hood device configured as described above, the first arm is disposed at the vehicle width direction inner side of the hinge base that is fixed to the vehicle body, and the first arm is coupled to the hinge base, so as to be capable of swinging, via a first pin having an axial direction in the vehicle width direction. The second arm is disposed at the vehicle width direction inner side of the first arm. The second arm is coupled to the first arm via the second pin so as to be capable of swinging, and is fixed to the vehicle width direction outer side end portion of the rear section of the hood. Moreover, the actuator is coupled to the first arm via the first coupling shaft, and the actuator is coupled to the second arm via the second coupling shaft disposed at the rear side of the first coupling shaft.

When the actuator is actuated, the second arm swings with respect to the first arm, and the vehicle width direction outer side end portion of the rear section of the hood is moved toward the vehicle upper side. Namely, the hood is popped up to the lifted position.

The first coupling shaft, the second coupling shaft, and the second pin are disposed at the vehicle front side and the vehicle width direction inner side of the first pin. Namely, the first coupling shaft, this being a point of action of the first arm on which actuation load of the actuator acts, is disposed at the vehicle front side and the vehicle width direction inner side of the first pin, this being a swing pivot point of the first arm. Accordingly, in the first arm, an imaginary line connecting the swing pivot point (first pin) and the point of action (first coupling shaft) is inclined toward the vehicle width direction inner side on progression toward the vehicle front side in vehicle plan view.

Note that in vehicle plan view, the actuator is disposed at an incline toward the vehicle width direction inner side on progression toward the vehicle front side. Accordingly, the actuation load input to the first coupling shaft from the actuator acts in a direction inclined toward the vehicle width direction inner side on progression toward the vehicle front side in vehicle plan view. Accordingly, in vehicle plan view, the direction of the actuation load can be brought closer to being parallel to the imaginary line connecting the swing pivot point (first pin) and the point of action (first coupling shaft) of the first arm. This thereby enables rotation moment arising in the first arm due to the actuation load of the actuator to be suppressed. Flexural deformation of the first arm can accordingly be suppressed as a result.

Moreover, the respective axial lines of the first coupling shaft, the second coupling shaft, and the second pin are orthogonal to the actuator. Namely, the respective axial lines of the first coupling shaft, the second coupling shaft, and the second pin are disposed parallel to each other in vehicle plan view, and are orthogonal to the actuator. Accordingly, the actuation load from the actuator acting on the first coupling shaft and the second coupling shaft acts in a direction orthogonal to the axial line of the second pin, thereby enabling the second arm to be swung as desired relative to the first arm. This thereby enables the hood to be lifted as desired.

A vehicle pop-up hood device according to a second aspect of the present invention is the vehicle pop-up hood device according to the first aspect of the present invention, wherein: the second arm extends along the actuator in plan view, and is fixed to the hood by a pair of front and rear fastening members; and among the pair of front and rear fastening members, a fastening member disposed at the vehicle front side is disposed at the vehicle width direction inner side with respect to a fastening member disposed toward the vehicle rear side.

In the vehicle pop-up hood device configured as described above, in plan view, the pair of fastening members can be disposed in a row along the front-rear direction, corresponding to the extension direction of the second arm. This thereby enables an increase in size of the second arm to be suppressed, thereby enabling an increase in size of the vehicle pop-up hood device to be suppressed.

A vehicle pop-up hood device according to a third aspect of the present invention is the vehicle pop-up hood device according to either the first aspect of the present invention or the second aspect of the present invention, further comprising an oscillation suppressing mechanism that couples the hinge base and the second arm together and that suppresses oscillation of the hood when the actuation of the actuator completes, wherein the oscillation suppressing mechanism is disposed between the second arm and the hinge base in the vehicle width direction.

In the vehicle pop-up hood device configured as described above, an area between the second arm, disposed offset to the vehicle width direction inner side with respect to the hinge base, and the hinge base, can be utilized for placement of the oscillation suppressing mechanism that suppresses oscillation of the hood.

The vehicle pop-up hood device according to the first aspect of the present invention enables the hood to be lifted as desired.

The vehicle pop-up hood device according to the second aspect of the present invention enables an increase in size of the second arm to be suppressed.

The vehicle pop-up hood device according to the third aspect of the present invention enables the area between the second arm and the hinge base to be utilized for placement of the oscillation suppressing mechanism.

BRIEF DESCRIPTION OF THE DRAWINGS

Exemplary embodiments of the present invention will be described in detail based on the following figures, wherein.

DETAILED DESCRIPTION

Explanation follows regarding a vehicle pop-up hood device 20 (referred to below as the "PUH device 20"), as an example of an exemplary embodiment according to technology disclosed herein, with reference to the drawings. Note that in each of the drawings, the arrow FR, the arrow UP, and the arrow RH respectively indicate a front direction (direction of progress), an upward direction, and a right direction of a vehicle applied with the PUH device 20. In the following explanation, unless specifically stated otherwise, reference simply to the front and rear, up and down, and left and right directions refers to the front and rear in a vehicle front-rear direction, up and down in a vehicle up-down direction, and left and right in a vehicle left-right direction (vehicle width direction).

Figure 7:
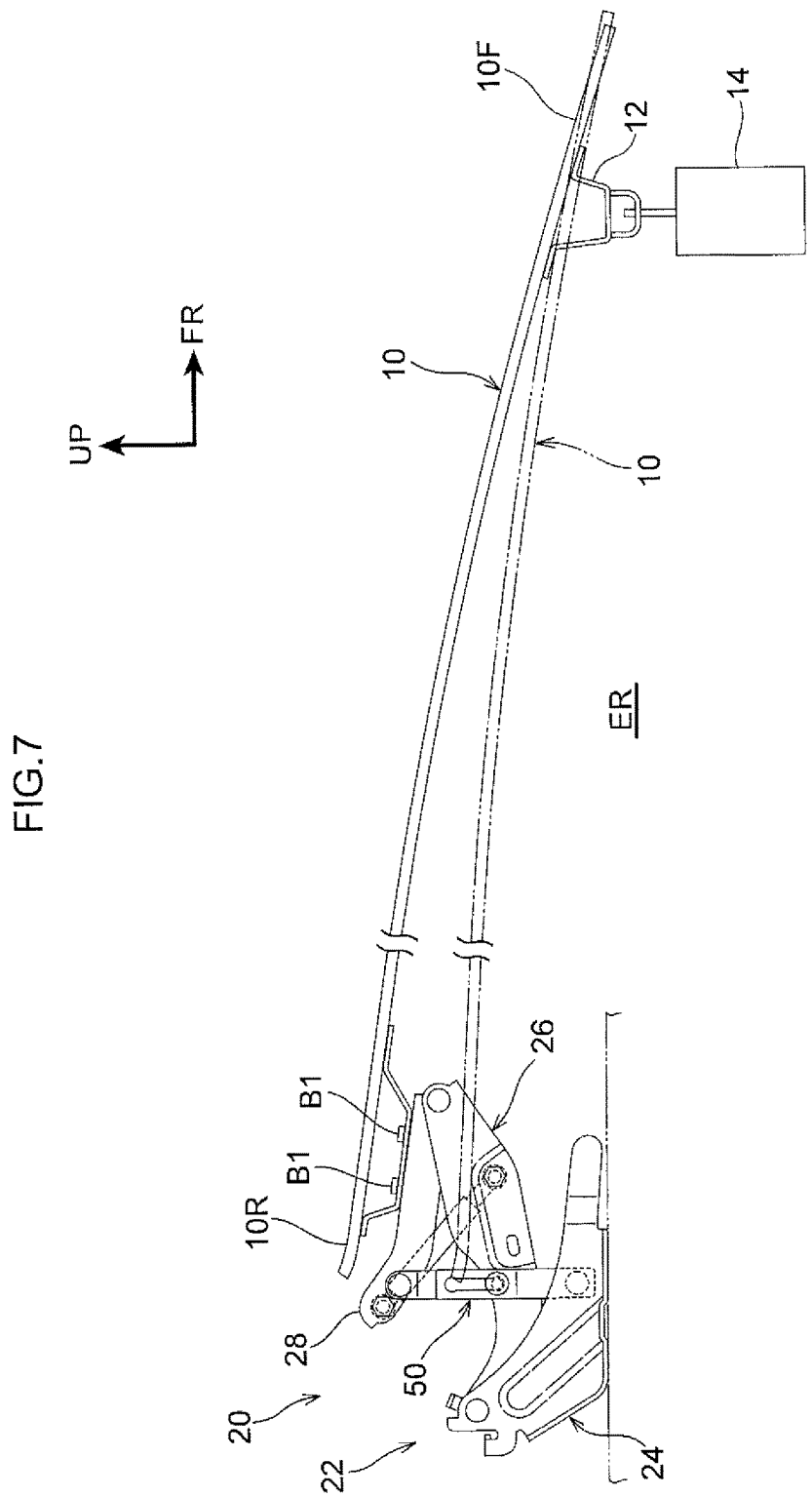
FIG. 7 is a schematic side view illustrating a vehicle front section applied with a vehicle pop-up hood device of the present exemplary embodiment, as viewed from the vehicle right side.

As illustrated in FIG. 7, the PUH devices 20 of an exemplary embodiment according to technology disclosed herein are each configured by a hood hinge with a pop-up function, and are provided with a function of popping up (lifting) a rear end section 10R of a front hood 10, serving as an example of a "hood" according to technology disclosed herein, from a closed position indicated by intermittent lines to a lifted position indicated by solid lines. First, explanation follows regarding a schematic configuration of the front hood 10, followed by explanation regarding the PUH devices 20.

Front Hood 10 Configuration

Figure 8:
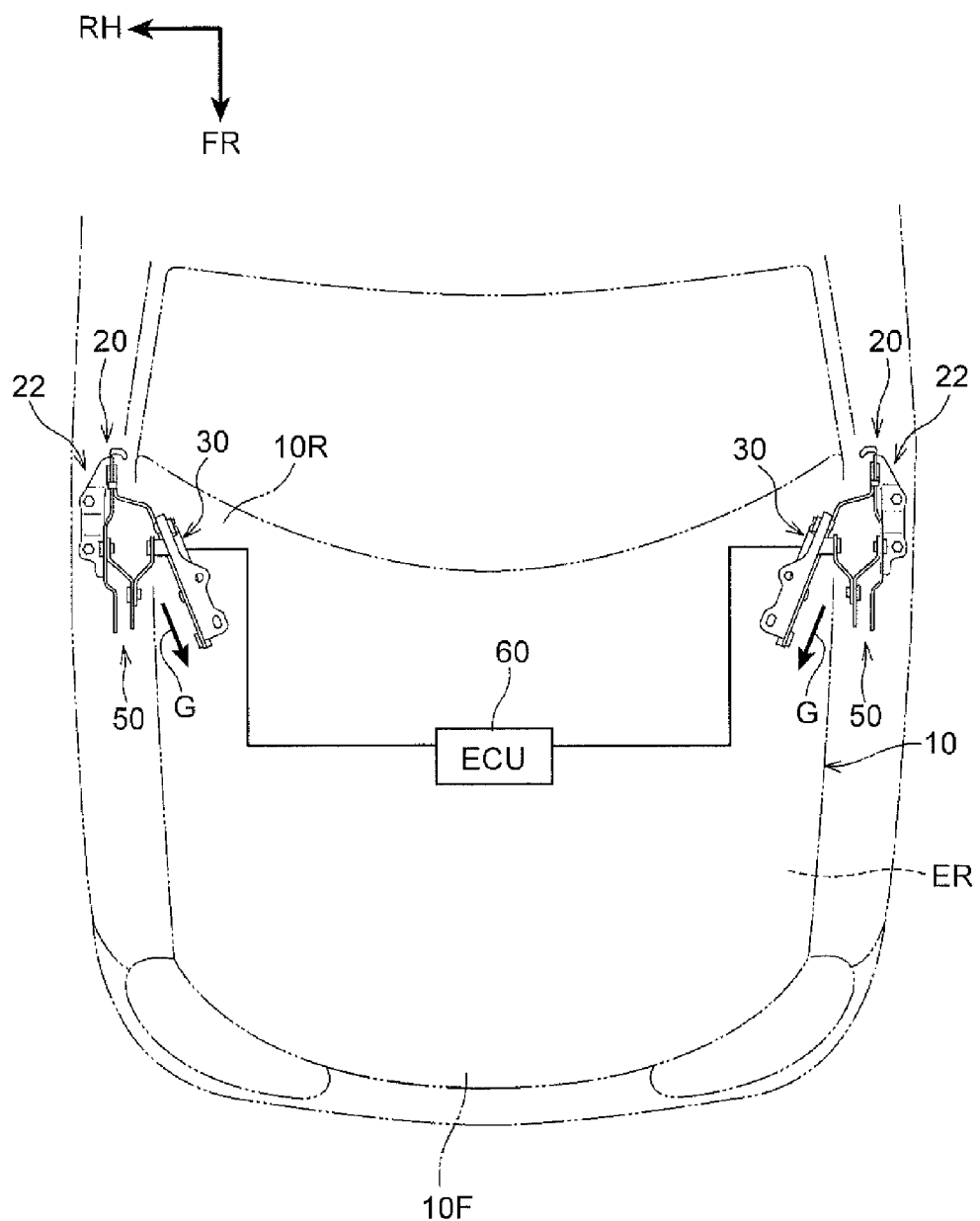
FIG. 8 is a schematic plan view illustrating the vehicle front section illustrated in FIG. 7.

As illustrated in FIG. 8, the front hood 10 extends along the front-rear direction and the width direction (left-right direction), and is formed in a substantially rectangular shape in vehicle plan view. The front hood 10 covers a power unit room ER that houses a power unit, not illustrated in the drawings, from an upper side. The rear end section 10R of the front hood 10 is swingably supported by a pair of left and right PUH devices 20 disposed separated from each other in the vehicle width direction. In other words, both vehicle width direction end portions of the rear end section 10R of the front hood 10 are swingably supported by the PUH devices 20. As illustrated in FIG. 7, a hood striker 12 is fixed to a vehicle width direction intermediate portion of a front end section 10F of the front hood 10. The front hood 10 is retained in the closed position (namely, the front hood 10 is restricted from swinging) by anchoring the hood striker 12 to a single hood lock device 14 disposed at a vehicle width direction intermediate portion of a front end section of a vehicle body.

PUH Device 20

As illustrated in FIG. 8, the PUH devices 20 are respectively installed at both vehicle width direction end portions of the rear end section 10R of the front hood 10, and are configured with left-right symmetry to each other. Accordingly, the following explanation describes the PUH device 20 disposed on the right side, and explanation regarding the PUH device 20 disposed on the left side is omitted.

Figure 1:
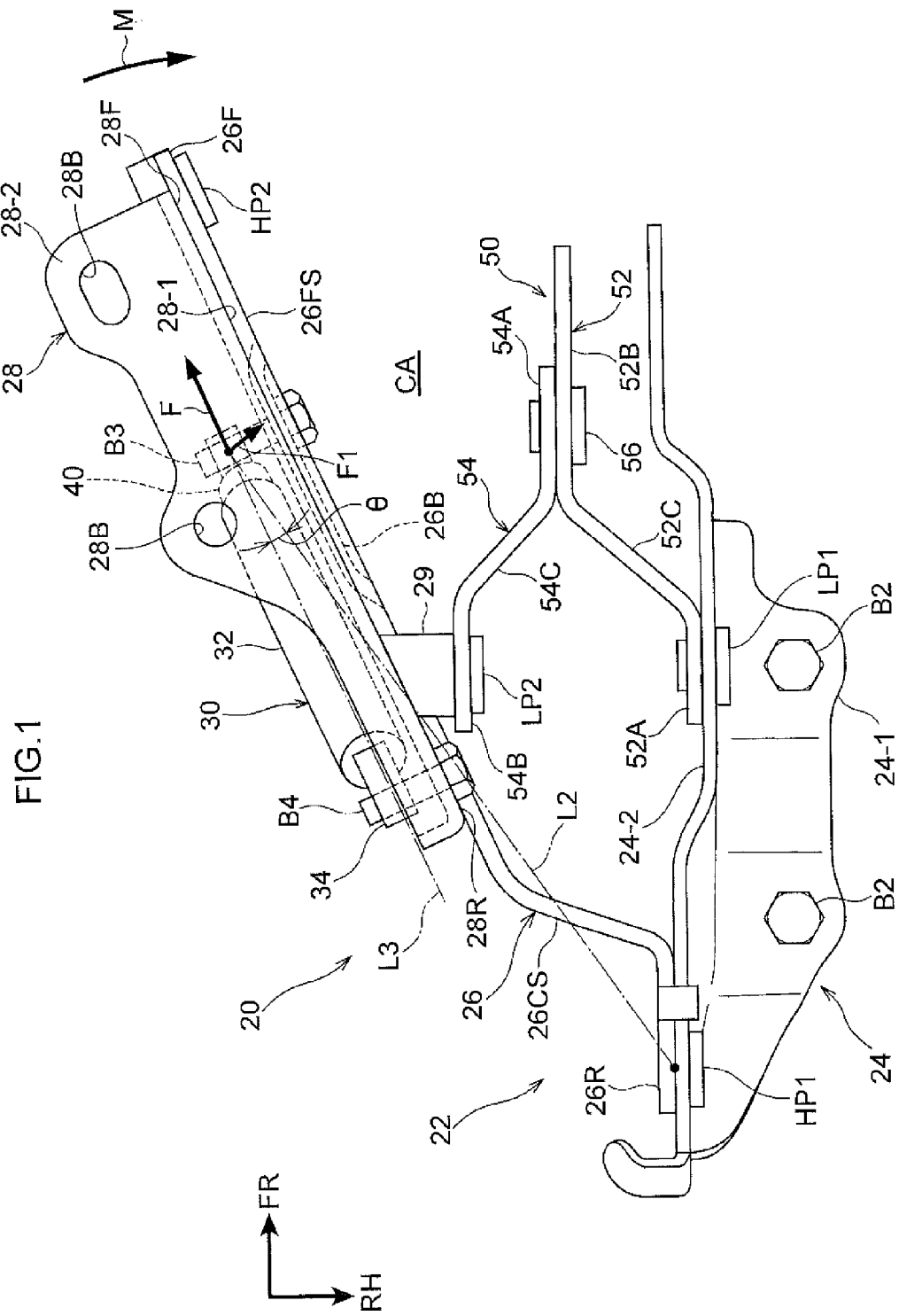
FIG. 1 is a plan view illustrating a vehicle pop-up hood device of an exemplary embodiment, in a state prior to actuation.
Figure 2:
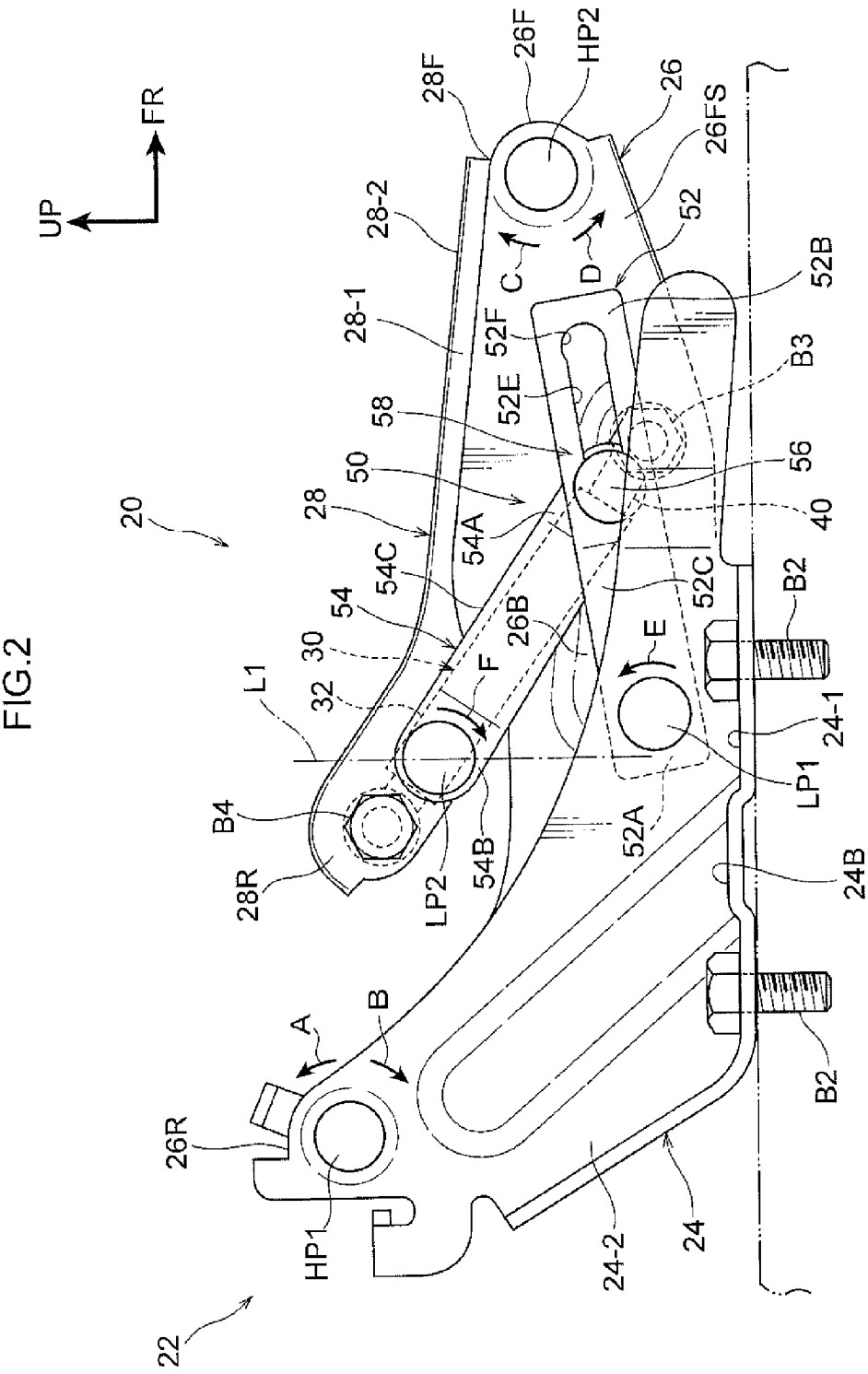
FIG. 2 is a side view illustrating the vehicle pop-up hood device illustrated in FIG. 1 as viewed from a vehicle right side.

As illustrated in FIG. 1 and FIG. 2, the PUH device 20 is configured including a hood hinge 22 that supports the front hood 10 so as to be capable of opening and closing, an actuator 30 that actuates in the event of a collision between the vehicle and a pedestrian, and an oscillation suppressing mechanism 50 for suppressing oscillation of the front hood 10 after actuation of the actuator 30. Specific explanation thereof follows.

Hood Hinge 22

The hood hinge 22 is configured including a hinge base 24 that is fixed to the vehicle body, a first arm 26 that is coupled to the hinge base 24 so as to be capable of swinging, and a second arm 28 that is coupled to the first arm 26 so as to be capable of swinging and that is fixed to the rear end section 10R of the front hood 10 via hinge bolts B1 (see FIG. 7), serving as an example of "fastening members" according to technology disclosed herein.

The hinge base 24 is, for example, formed by pressing a sheet steel member, and is bent substantially into an inverted L-shape as viewed from the front of the vehicle. A lower end portion of the hinge base 24 configures an attachment wall portion 24-1. The attachment wall portion 24-1 has a plate thickness direction running substantially in the up-down direction, and extends along the front-rear direction. The attachment wall portion 24-1 is fixed to the vehicle body by attachment bolts B2, and the attachment bolts B2 are disposed with a specific spacing between each other in the front-rear direction, The hinge base 24 includes a side wall portion 24-2. The side wall portion 24-2 extends from a vehicle width direction inner side end of the attachment wall portion 24-1 toward the upper side. The side wall portion 24-2 is formed substantially in a V-shape, opening toward the oblique upper front as viewed from the side of the vehicle. The hinge base 24 is formed with a bead portion 24B. The bead portion 24B extends from a vehicle width direction outer side end of the attachment wall portion 24-1 toward the vehicle width direction inner side, and extends from a lower end of the side wall portion 24-2 toward the upper side.

As illustrated in FIG. 1, the first arm 26 is, for example, formed by pressing a sheet steel member similarly to the hinge base 24, and is bent substantially into a crank shape in plan view. Specifically, the first arm 26 is configured including a rear end wall 26R disposed with a plate thickness direction in the vehicle width direction, an intermediate inclined wall 26CS inclined toward the vehicle width direction inner side on progression from a front end of the rear end wall 26R toward the front side, and a front side inclined wall 26FS inclined toward the vehicle width direction inner side on progression from a front end of the intermediate inclined wall 26CS toward the front side. The angle of inclination of the intermediate inclined wall 26CS with respect to the front-rear direction is set larger than an angle of inclination of the front side inclined wall 26FS with respect to the front-rear direction.

The first arm 26 is disposed at the vehicle width direction inner side of the hinge base 24. The rear end wall 26R of the first arm 26 is coupled to an upper end portion of the side wall portion 24-2 of the hinge base 24 so as to be capable of swinging by a first hinge pin HP1 (an example of a "first pin" according to technology disclosed herein) that has an axial direction running along the vehicle width direction. The first arm 26 is thereby configured capable of swinging about the first hinge pin HP1 so as to swing in the up-down direction (the arrow A direction and the arrow B direction in FIG. 2) relative to the hinge base 24.

As described above, the intermediate inclined wall 26CS of the first arm 26 is inclined toward the vehicle width direction inner side on progression toward the front side in vehicle plan view. Accordingly, the front side inclined wall 26FS of the first arm 26 is disposed further to the vehicle width direction inner side than the rear end wall 26R of the first arm 26. A portion (area) between the front side inclined wall 26FS of the first arm 26 and the hinge base 24 configures a housing area CA that houses the oscillation suppressing mechanism 50, described later.

Figure 3:
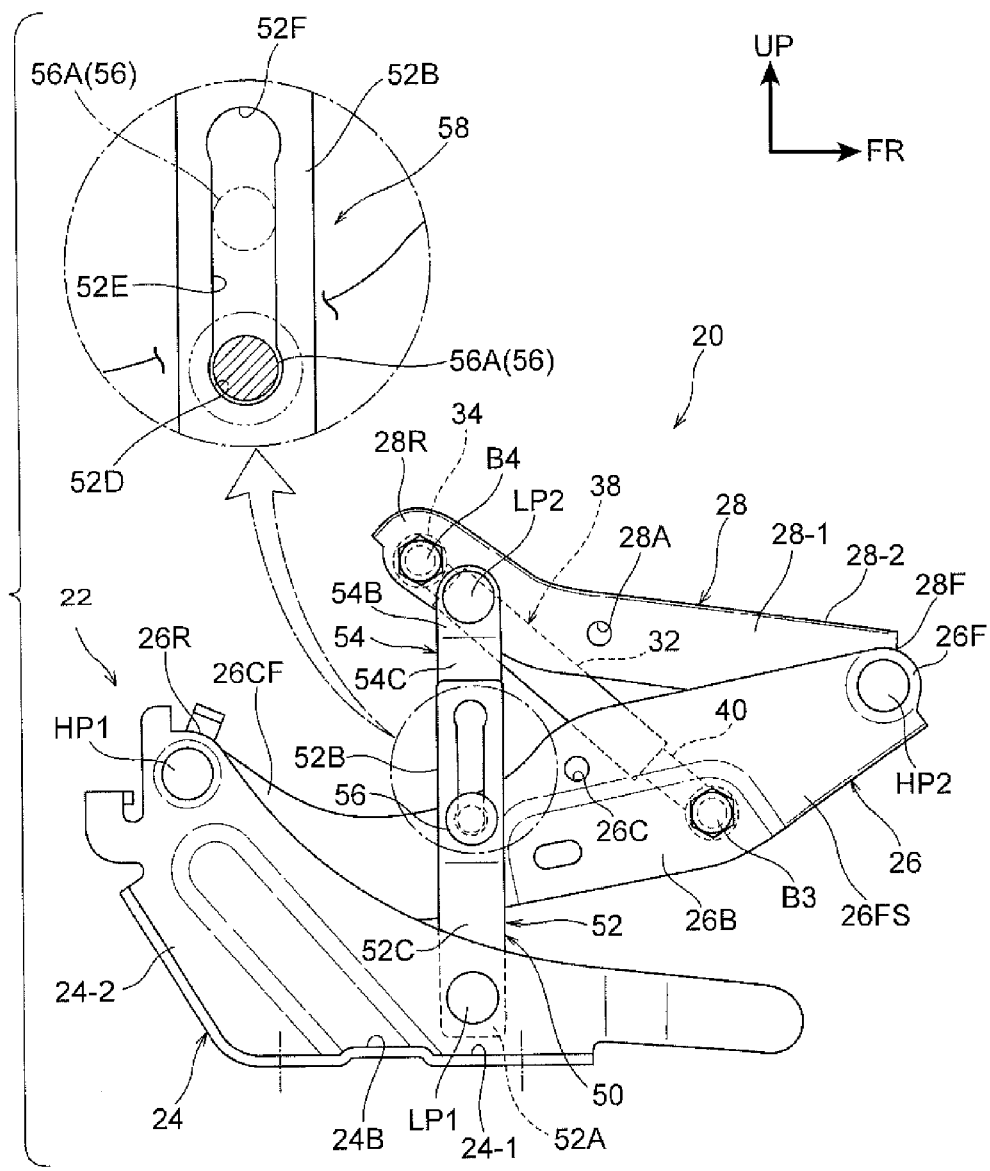
FIG. 3 is a side view of the vehicle pop-up hood device illustrated in FIG. 2 as viewed from the vehicle right side, in a state following actuation.

As illustrated in FIG. 3, a lower portion of a length direction intermediate portion of the front side inclined wall 26FS is formed with a first protruding portion 26B that protrudes out toward the vehicle width direction inner side. A front portion of the first protruding portion 26B is integrally provided with a first coupling bolt B3, serving as an example of a "first coupling shaft" according to technology disclosed herein, for attaching the actuator 30, described later. The first coupling bolt B3 projects out toward the vehicle width direction inner side with an axial direction running along the plate thickness direction of the front side inclined wall 26FS. Namely, in vehicle plan view, (an axial line of) the first coupling bolt B3 is inclined toward the rear side on progression toward the vehicle width direction inner side, and is orthogonal to the front side inclined wall 26FS (see FIG. 1). Moreover, the first coupling bolt B3 is disposed at the front side and the vehicle width direction inner side of the first hinge pin HP1.

A shear pin insertion hole 26C, through which a shear pin, not illustrated in the drawings, is inserted, is formed in the front side inclined wall 26FS at a position to an upper side of the first protruding portion 26B, and penetrates the front side inclined wall 26FS in the plate thickness direction.

As illustrated in FIG. 1 and FIG. 2, the second arm 28 is, for example, formed by pressing a sheet steel member, similarly to the hinge base 24 and the first arm 26. The second arm 28 is disposed at the vehicle width direction inner side of the first arm 26, and extends at an incline toward the vehicle width direction inner side on progression toward the vehicle front side in vehicle plan view. The second arm 28 is bent substantially into an inverted L-shape as viewed from the front of the vehicle. Specifically, the second arm 28 includes a side wall portion 28-1 disposed parallel to the front side inclined wall 26FS of the first arm 26. A front end portion 28F of the side wall portion 28-1 (second arm 28) is coupled to a front end portion 26F of the first arm 26 (front side inclined wall 26FS) so as to be capable of swinging by a second hinge pin HP2, serving as a "second pin" of an example of technology disclosed herein, The (axial direction of the) second hinge pin HP2 is disposed parallel to the (axial direction of the) first coupling bolt B3. Namely, the (axial direction of the) second hinge pin HP2 is inclined toward the rear side on progression toward the vehicle width direction inner side in vehicle plan view, is disposed orthogonally to the front side inclined wall 26FS and the side wall portion 28-1, and is disposed at the front side and vehicle width direction inner side of the first hinge pin HP1. The second arm 28 is thereby configured capable of swinging about the second hinge pin HP2 so as to swing in the up-down direction (the arrow C direction and the arrow D direction in FIG. 2) relative to the first arm 26.

The side wall portion 28-1 of the second arm 28 is formed with a shear pin insertion hole 28A (see FIG. 3) penetrating at a position corresponding to the shear pin insertion hole 26C of the first arm 26 described above. A shear pin, not illustrated in the drawings, is fitted into the shear pin insertion hole 26C of the first arm 26 and the shear pin insertion hole 28A of the second arm 28, thereby joining the second arm 28 to the first arm 26. Accordingly, the second arm 28 is restricted from swinging relative to the first arm 26 in a non-actuated state of the actuator 30, described later.

The second arm 28 includes an upper wall portion 28-2. The upper wall portion 28-2 extends out from an upper end of the side wall portion 28-1 toward the vehicle width direction inner side along a plate thickness direction of the upper wall portion 28-2, and extends in the front-rear direction along the front hood 10 as viewed from the side. A pair of attachment holes 28B (see FIG. 1) are formed penetrating the upper wall portion 28-2, and the pair of attachment holes 28B are disposed in a row along an extension direction of the side wall portion 28-1 in vehicle plan view. Namely, the attachment hole 28B disposed at a front side is disposed at the vehicle width direction inner side of the attachment hole 28B disposed at a rear side. The hinge bolts B1 (see FIG. 7) are inserted through the respective attachment holes 28B from a lower side, thereby fastening (fixing) the upper wall portion 28-2 to the rear end section 10R of the front hood 10. The hinge base 24 and the front hood 10 are thereby coupled together by the first arm 26 and the second arm 28.

At a position at the rear side of the first coupling bolt B3, a rear end portion 28R of the side wall portion 28-1 of the second arm 28 is integrally provided with a second coupling bolt B4, serving as an example of a "second coupling shaft" of technology disclosed herein, for attaching the actuator 30, described later. A head of the second coupling bolt B4 is disposed at the vehicle width direction outer side of the side wall portion 28-1, and the second coupling bolt B4 projects out toward the vehicle width direction inner side with an axial direction in the plate thickness direction of the side wall portion 28-1. Namely, (an axial line of) the second coupling bolt B4 is disposed parallel to (the axial line of) the first coupling bolt B3, and is disposed inclined toward the rear side on progression toward the vehicle width direction inner side, and orthogonally to the side wall portion 28-1 in vehicle plan view (see FIG. 1).

The rear end portion 28R of the side wall portion 28-1 of the second arm 28 is integrally provided with a stud 29 for coupling a second link 54 of the oscillation suppressing mechanism 50, described later, at a position at the front side of the second coupling bolt B4. The stud 29 projects out toward the vehicle width direction outer side with an axial direction running in the vehicle width direction. A leading end face of the stud 29 is disposed in a direction orthogonal to the vehicle width direction.

The hood hinge 22 configured as described above functions as a hinge component that swingably supports the front hood 10. Namely, during normal opening and closing of the front hood 10, the front hood 10 is opened and closed by swinging the first arm 26 with respect to the hinge base 24 about the first hinge pin HP1, in a state in which the first arm 26 and the second arm 28 are restricted from swinging relative to each other.

Actuator 30

Figure 5:
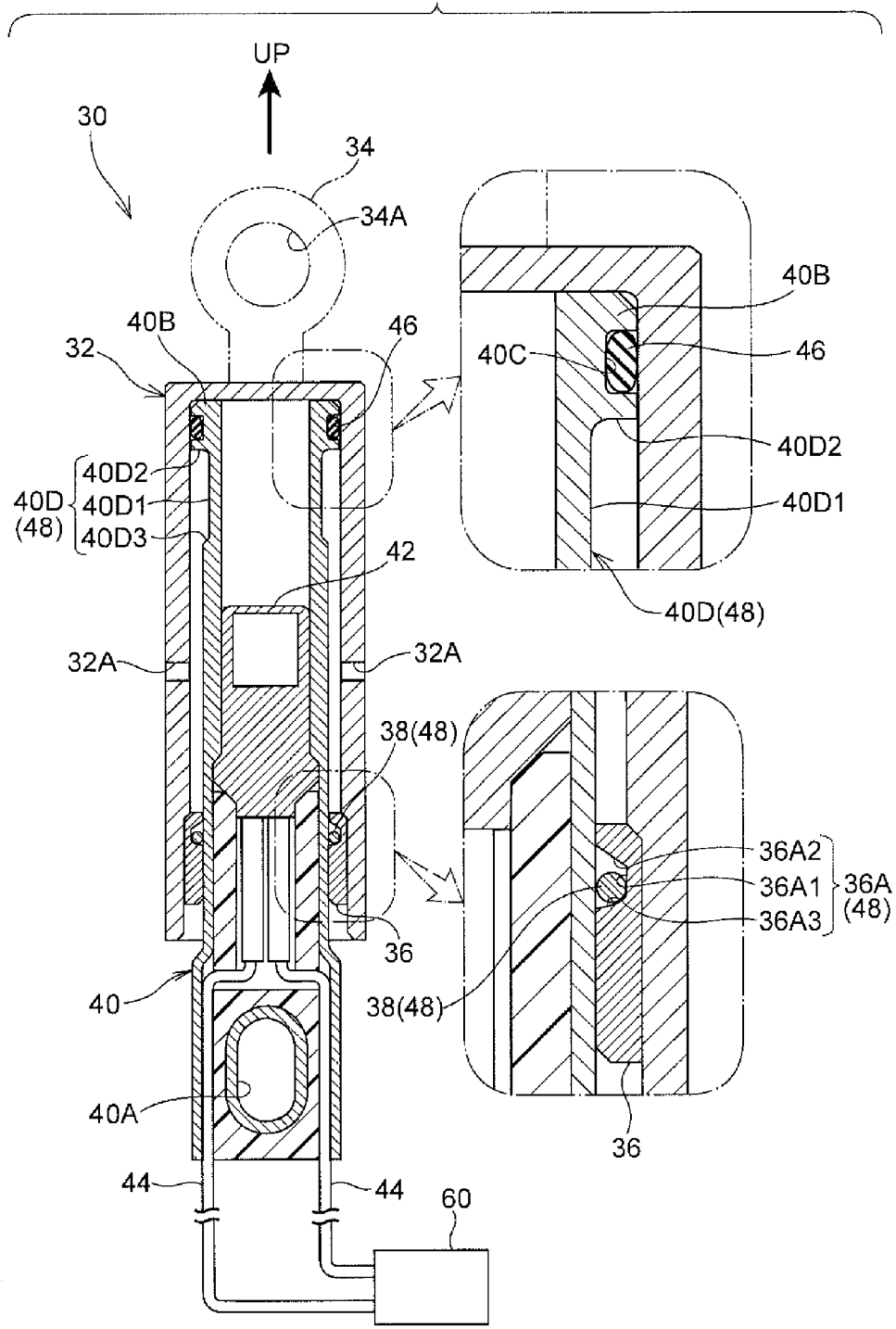
FIG. 5 is an enlarged cross-section illustrating an actuator illustrated in FIG. 1, in a state prior to actuation.
Figure 6:
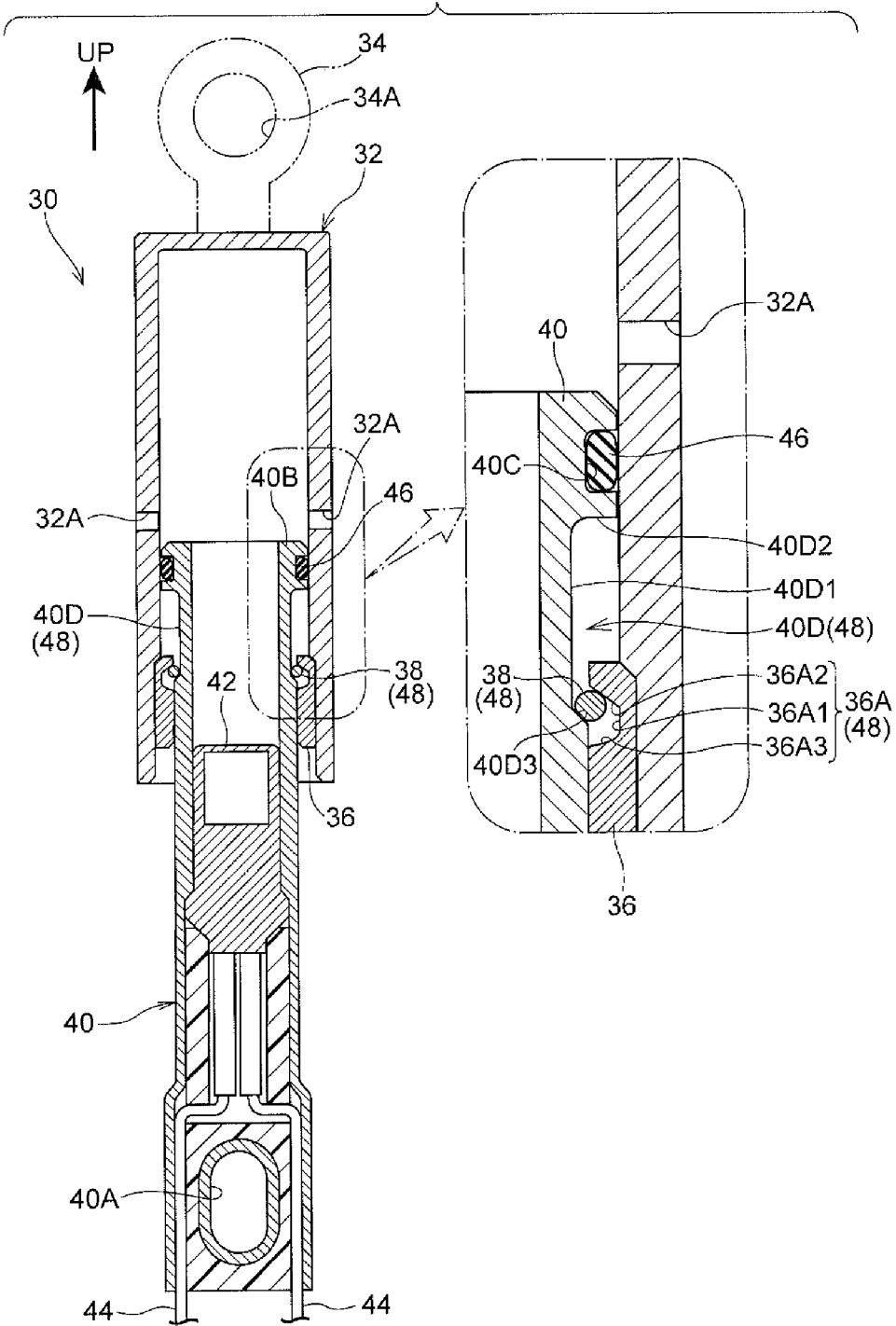
FIG. 6 is a cross-section illustrating the actuator illustrated in FIG. 5, in a state following actuation.

As illustrated in FIG. 1, the actuator 30 is formed in a substantially circular column shape, and is disposed at the vehicle width direction inner side of the second arm 28. The actuator 30 extends so as to span between the first coupling bolt B3 of the first arm 26 and the second coupling bolt 114 of the second arm 28. Namely, in vehicle plan view, the actuator 30 is disposed along the side wall portion 28-1 of the second arm 28, and is inclined toward the vehicle width direction inner side on progression toward the front side. As illustrated in FIG. 5 and FIG. 6, the actuator 30 is configured including a cylinder 32, a rod 40, and a retention mechanism 48.

The cylinder 32 is formed in a bottomed, substantially circular cylinder shape opening toward a lower side (a lower end side of the actuator 30). An upper end portion of the cylinder 32 is integrally provided with an upper end side attachment portion 34, and an attachment hole 34A is formed penetrating the upper end side attachment portion 34. The attachment hole 34A is disposed coaxially to the second coupling bolt 114 of the second arm 28 described above, and the second coupling bolt B4 is inserted into the attachment hole 34A, thereby swingably supporting the upper end side attachment portion 34. The upper end portion of the cylinder 32 is thereby attached so as to be capable of swinging relative to the second arm 28 (see FIG. 1).

A head portion 36 is provided at an inner peripheral portion of a lower end portion of the cylinder 32. The head portion 36 is formed in a substantially circular cylinder shape, and is fixed to an inner peripheral portion of the cylinder 32. A housing groove 36A configuring the retention mechanism 48 is formed at an inner peripheral portion of the head portion 36. The housing groove 36A extends around a circumferential direction of the head portion 36, and is formed running around the entire circumference of the head portion 36. The housing groove 36A is formed with a substantially U-shaped cross-section profile opening toward a radial direction inner side of the cylinder 32. Specifically, as viewed in vertical cross-section, the housing groove 36A is configured including a bottom face 36A1 disposed along the axial direction (the up-down direction) of the cylinder 32, an upper inclined face 36A2 inclined toward the upper side of the cylinder 32 on progression from an upper end of the bottom face 36A1 toward a radial direction inner side of the cylinder 32, and a lower inclined face 36A3 slightly inclined toward the lower end side of the cylinder 32 on progression from a lower end of the bottom face 36A1 toward the radial direction inner side of the cylinder 32. A boundary portion connects smoothly between the lower inclined face 36A3 and the bottom face 36A1 in a circular arc shape.

A lock ring 38 configuring the retention mechanism 48 (an element understood as falling under the broad definition of a "retention member") is disposed (housed) inner side the housing groove 36A. The lock ring 38 is configured by a metal wire member with a circular cross-section profile, and is formed in an annular shape (ring shape) with an open portion. In other words, the lock ring 38 is formed in a substantially C-shape. The lock ring 38 has spring properties, and is configured so as to be capable of elastically deforming in its radial direction. The lock ring 38 is housed inner side the housing groove 36A in a state elastically deformed from its natural state (a state in which the lock ring 38 is not elastically deformed) toward the radial direction outer side, and abutting an outer peripheral portion of the rod 40, described later.

The rod 40 is formed in a substantially circular cylinder shape, and is disposed coaxially to the cylinder 32. With the exception of a lower end portion, the rod 40 is housed inner side the cylinder 32 so as to be capable of moving relative to the cylinder 32. Specifically, when the cylinder 32 moves relative to the rod 40 in an up-down direction along the axial direction of the rod 40, the lock ring 38 also moves relative to the rod 40 together with the cylinder 32, such that the lock ring 38 is configured so as to slide against an outer peripheral face of the rod 40. Namely, the lock ring 38 is configured so as to be capable of moving relative to the rod 40 together with the cylinder 32.

An attachment hole 40A is formed penetrating the lower end portion of the rod 40. The attachment hole 40A is disposed coaxially to the first coupling bolt B3 of the first arm 26 described above, and the first coupling bolt B3 is inserted into the attachment hole 40A such that the lower end portion of the rod 40 is swingably supported. Namely, the lower end portion of the rod 40 is attached to the first arm 26 so as to be capable of swinging relative to the first arm 26 (see FIG. 1).

A substantially circular cylinder shaped micro gas generator 42 (referred to below as the "MGG 42") is fitted into a length direction intermediate portion of the rod 40. The micro gas generator 42 includes a squib (ignition device), and the inner side of the MGG 42 is filled with a gas generating agent. Wire harnesses 44 are connected to a lower end of the micro gas generator 42, and the MGG 42 is electrically connected to an ECU 60 (see FIG. 5 and FIG. 8) through the wire harnesses 44. The MGG 42 is accordingly actuated under the control of the ECU 60. When the MGG 42 is actuated, gas generated by the MGG 42 is supplied inner side the rod 40. The wire harnesses 44 extending out from the lower end of the MGG 42 are laid out inner side the rod 40, and lead out from the lower end portion of the rod 40 toward the outer side. The inner side of the rod 40 is filled with a resin material, thereby integrating the wire harnesses 44 and the rod 40 together.

A substantially annular shaped large diameter portion 40B is formed projecting out toward the radial direction outer side at an upper end portion of the rod 40. An external diameter dimension of the large diameter portion 40B is set slightly smaller than an internal diameter dimension of the cylinder 32. A sealing groove 40C is formed at an outer peripheral portion of the large diameter portion 40B. The sealing groove 40C is open toward the radial direction outer side of the rod 40 and extends around a circumferential direction of the large diameter portion 40B, and is formed running around the entire circumference of the large diameter portion 40B. An O-ring 46 configured by a rubber member or the like is disposed inside the sealing groove 40C, and the O-ring 46 seals between the rod 40 and the cylinder 32.

A retention groove 40D configuring the retention mechanism 48 is formed in the outer peripheral portion of the rod 40 at a position further toward the lower end side of the rod 40 than the large diameter portion 40B. The retention groove 40D opens toward the radial direction outer side of the rod 40, extends around the circumferential direction of the rod 40, and is formed running around the entire circumference of the rod 40. Specifically, as viewed in vertical cross-section, the retention groove 40D is configured including a bottom face 40D1 disposed in the axial direction (the up-down direction) of the rod 40, an upper face 40D2 extending from an upper end of the bottom face 40D1 toward the radial direction outer side of the rod 40, and a lower inclined face 40D3 inclined toward the lower end side of the rod 40 on progression from a lower end of the bottom face 40D1 toward the radial direction outer side of the rod 40.

When the MGG 42 is actuated, gas generated by the MGG 42 is supplied into the rod 40, and the cylinder 32 rises along the axial direction of the actuator 30 by the pressure of the gas inside the rod 40. Configuration is thereby made such that the second arm 28 swings from the position illustrated in FIG. 2 toward the upper side (in the arrow C direction in FIG. 2) relative to the first arm 26, and the front hood 10 is lifted to a lifted position (the position illustrated in FIG. 7). Note that when this occurs, the first arm 26 swings from the position illustrated in FIG. 2 toward the upper side (in the arrow A direction in FIG. 2) relative to the hinge base 24 (see FIG. 3).

As illustrated in FIG. 5 and FIG. 6, plural gas escape holes 32A are formed in a lower end portion of the cylinder 32 (at two locations in the present exemplary embodiment). The gas escape holes 32A are disposed further toward a lower end side of the actuator 30 than the O-ring 46 in a non-actuated state (the state illustrated in FIG. 5) of the actuator 30. The gas escape holes 32A are set such that when the actuator 30 is actuated and the cylinder 32 has been raised to the lifted position (the state illustrated in FIG. 6), the gas escape holes 32A are disposed further toward an upper end side of the actuator 30 than the rod 40 (the O-ring 46). Accordingly, configuration is made such that after actuation of the actuator 30, the inner side and the outer side of the cylinder 32 are placed in communication with each other through the gas escape holes 32A, and the gas that has been supplied into the cylinder 32 (the rod 40) is discharged (escapes) through the gas escape holes 32A. As a result, configuration is made such that lifting of the front hood 10 by the actuator 30 due to the gas pressure ceases at the lifted position of the front hood 10.

Moreover, as illustrated in FIG. 6, setting is made such that when the cylinder 32 has been raised to the lifted position, the housing groove 36A is disposed at the radial direction outer side of the actuator 30 with respect to a lower end portion of the retention groove 40D of the rod 40. Namely, setting is made such that the housing groove 36A (the lock ring 38) and the lower end portion of the retention groove 40D are disposed facing each other in the radial direction of the actuator 30. Moreover, when this occurs, the lock ring 38 undergoes elastic deformation toward the radial direction inner side (decreases in diameter), and enters the retention groove 40D, such that the lock ring 38 and the lower inclined face 40D3 of the retention groove 40D engage with each other. Moreover, the groove depth of the retention groove 40D and the wire diameter of the lock ring 38 are set such that when this is performed, part of the lock ring 38 projects out further toward the radial direction outer side than the outer peripheral portion of the rod 40. The lock ring 38 is thereby interposed between the upper inclined face 36A2 of the housing groove 36A and the lower inclined face 40D3 of the retention groove 40D in the up-down direction, anchoring the cylinder 32 to the lock ring 38 at the location of the housing groove 36A. The cylinder 32 is thereby restricted from retracting, and movement of the front hood 10 toward the lower side when at the lifted position is restricted by the retention mechanism 48.

As will be described in detail later, configuration is made such that the cylinder 32 rises with respect to the rod 40 while the lock ring 38 slides against the bottom face 40D1 of the retention groove 40D when a specific load toward the upper side is input to the upper end side attachment portion 34 of the cylinder 32 due to the behavior of the front hood 10 when lifted to the lifted position. Namely, in the actuator 30, a width dimension of the retention groove 40D (an up-down direction dimension of the bottom face 40D1) is set such that the cylinder 32 (lock ring 38) can be raised further than its position when actuation has been completed, illustrated in FIG. 6. Specifically, the width dimension of the retention groove 40D (the up-down direction dimension of the bottom face 40D1) is set corresponding to the lifted position, and to an upper limit position, described later. More specifically, the width dimension of the retention groove 40D is set corresponding to a distance between a coupling hole 52D of a first link 52, described later, and a retention hole 52F.

Oscillation Suppressing Mechanism 50

As illustrated in FIG. 1 to FIG. 4, the oscillation suppressing mechanism 50 is disposed between the front side inclined wall 26FS of the first arm 26 and the second arm 28, and the hinge base 24 (namely in the housing area CA (see FIG. 1)), and spans between the hinge base 24 and the second arm 28. In other words, the oscillation suppressing mechanism 50 is disposed at the vehicle width direction outer side of the front side inclined wall 26FS of the first arm 26 and the second arm 28. Moreover, the oscillation suppressing mechanism 50 is formed with a link mechanism configured by the first link 52 and the second link 54, and includes a displacement mechanism 58 at a coupling location between the First link 52 and the second link 54. When the front hood 10 is in the closed position, the oscillation suppressing mechanism 50 is bent substantially into a V-shape, opening toward the rear side as viewed from the side (the state illustrated in FIG. 2; this state is referred to below as a "stowed state").

The first link 52 is configured from a sheet metal material such as sheet steel, and is formed in a substantially elongated plate shape. The first link 52 configures a portion on one end side (a portion at a lower side) of the oscillation suppressing mechanism 50, and is disposed with a plate thickness direction in the vehicle width direction at the vehicle width direction inner side of the hinge base 24. As viewed from the side, in the stowed state, the first link 52 is disposed at a slight incline toward the upper side on progression toward the front side. A first link pin LP1 with an axial direction in the vehicle width direction couples one end portion 52A of the first link 52 to a lower end portion of the side wall portion 24-2 of the hinge base 24 such that the one end portion 52A is capable of swinging. Specifically, the first link pin LP1 is disposed at a front-rear direction intermediate portion of a lower end portion of the side wall portion 24-2 (see FIG. 2).

As illustrated in FIG. 1, a length direction intermediate portion of the first link 52 is formed with a first link intermediate portion 52C, and the first link intermediate portion 52C extends along the vehicle width direction at an incline toward the vehicle width direction inner side on progression toward another length direction side of the first link 52 (another end portion 52B side of the first link 52). The other end portion 52B is thereby disposed offset to the vehicle width direction inner side with respect to one end portion 52A of the first link 52.

As illustrated in the enlarged partial view in FIG. 3, the circular shaped coupling hole 52D for coupling the second link 54, described later, is formed penetrating the other end portion 52B of the first link 52. A slot 52E configuring the displacement mechanism 58 is formed penetrating the other end portion of the first link 52 on the other end side of the first link 52 to the coupling hole 52D. The slot 52E extends along the length direction of the first link 52, and one end of the slot 52E is in communication with the coupling hole 52D. In other words, the slot 52E extends out from the coupling hole 52D toward the other end side of the first link 52. A width dimension of the slot 52E is set smaller than a diameter dimension of the coupling hole 52D, and is set so as to be uniform throughout the length direction of the slot 52E. The circular retention hole 52F configuring the displacement mechanism 58 is formed penetrating the other end portion of the slot 52E, and a diameter dimension of the retention hole 52F is set so as to be the same as the diameter dimension of the coupling hole 52D.

As illustrated in FIG. 1 to FIG. 4, similarly to the first link 52, the second link 54 is configured from a sheet metal material such as sheet steel, and is formed in a substantially elongated plate shape. The second link 54 configures a portion on another end side (a portion at an upper side) of the oscillation suppressing mechanism 50, and is disposed at the vehicle width direction inner side of the first link 52 with a plate thickness direction in the vehicle width direction. As viewed from the side of the vehicle, in the stowed state of the oscillation suppressing mechanism 50, the second link 54 is disposed at an incline toward the lower side on progression toward the front side.

One end portion 54A of the second link 54 is disposed adjacent on the vehicle width direction inner side to the other end portion 52B of the first link 52, and is rotatably coupled to the other end portion 52B of the first link 52 by a link shaft 56 that configures the displacement mechanism 58 and that has an axial direction running in the vehicle width direction. Specifically, the link shaft 56 is fixed to the one end portion 54A of the second link 54, and a shaft portion 56A of the link shaft 56 (see the enlarged partial view in FIG. 3) projects out from the one end portion 54A toward the vehicle width direction outer side, and is inserted into the coupling hole 52D. The shaft portion 56A of the link shaft 56 is formed with a substantially circular cross-section profile. A diameter dimension of the shaft portion 56A is set slightly smaller than the diameter dimension of the coupling hole 52D, and is set slightly larger than the width dimension of the slot 52E. The link shaft 56 is thereby swingably supported by the coupling hole 52D, and the one end portion 54A of the second link 54 is rotatably coupled to the other end portion 52B of the first link 52.

A length direction intermediate portion of the second link 54 is formed with a second link intermediate portion 54C (see FIG. 1). The second link intermediate portion 54C is inclined toward the vehicle width direction inner side on progression toward another length direction side of the second link 54 (another end portion 54B side of the second link 54). Accordingly, the other end portion 54B of the second link 54 is disposed offset to the vehicle width direction inner side with respect to the one end portion 54A of the second link 54.

The other end portion 54B of the second link 54 is disposed adjacent on the vehicle width direction outer side to the leading end face of the stud 29 of the second arm 28, and is coupled to the stud 29 so as to be capable of swinging by a second link pin LP2 that has an axial direction running in the vehicle width direction. Specifically, in the stowed state of the oscillation suppressing mechanism 50, the other end portion 54B of the second link 54 is disposed adjacent on the front side to the second coupling bolt B4. More specifically, the second link pin LP2 is disposed adjacently on a radial direction outer side of the second coupling bolt B4 (see FIG. 2).

As illustrated in FIG. 2, in the stowed state of the oscillation suppressing mechanism 50, as viewed from the side, the link shaft 56 is disposed at the front side of a hypothetical reference line L1 that passes through the axial center of the second link pin LP2 and runs in the up-down direction. Setting is made such that when the actuator 30 is actuated and the front hood 10 is lifted to the lifted position, the first link 52 swings relative to the hinge base 24 (see the arrow E in FIG. 2) and the second link 54 swings relative to the second arm 28 (see the arrow F in FIG. 2), and the oscillation suppressing mechanism 50 extends in a straight line shape running substantially in the up-down direction (the state illustrated in FIG. 3; this state is referred to below as an "actuated state").

As will be described in detail later, in the actuated state of the oscillation suppressing mechanism 50 illustrated in FIG. 3, when the specific load toward the upper side is input to the other end portion of the oscillation suppressing mechanism 50 (the other end portion 54B of the second link 54) due to oscillation arising in the front hood 10 that has been lifted to the lifted position, the swingably supported state of the link shaft 56 by the coupling hole 52D is released, and the displacement mechanism 58 actuates. Specifically, the link shaft 56 of the oscillation suppressing mechanism 50 is configured so as to move toward the upper side within the slot 52E, while enlarging the slot 52E toward the width direction outer side. Namely, during actuation of the displacement mechanism 58, the link shaft 56 moves toward the upper side along the slot 52E while sliding against inner peripheral faces of the slot 52E (see the link shaft 56 illustrated by double-dotted intermittent lines in the enlarged partial view in FIG. 3). When the link shaft 56 that has moved toward the upper side along the slot 52E reaches the inner side of the retention hole 52F, actuation of the displacement mechanism 58 is complete, and the link shaft 56 is retained in the retention hole 52F (see FIG. 4). Namely, when the specific load toward the upper side is input to the other end portion of the oscillation suppressing mechanism 50 (the other end portion 54B of the second link 54), the other end portion of the oscillation suppressing mechanism 50 is displaced toward the upper side together with the front hood 10, and the front hood 10 is retained at a position further to the upper side than the lifted position (the position illustrated in FIG. 4; this position is referred to below as an "upper limit position").

Note that the lifted position of the front hood 10 is set at a specific height so as to secure protection performance for a pedestrian falling onto the front hood 10 during a collision between the vehicle and the pedestrian. The upper limit position is set as follows, in order to suppress oscillation of the front hood 10 that has been lifted to the lifted position. Namely, as will be described in detail later, the upper limit position is set such that the front hood 10 that has been lifted to the lifted position exhibits simple harmonic oscillation, and such that the front hood 10 becomes substantially horizontal at a position where a vehicle width direction central portion of the front hood 10 reaches an upper dead center.

Next, explanation follows regarding operation and advantageous effects of an exemplary embodiment according to technology disclosed herein.

Where there is a frontal collision between the vehicle and a collision body, such as a pedestrian, in the closed position of the front hood 10, the frontal collision with the collision body is detected by a collision detection sensor (not illustrated in the drawings), and a collision signal is output to the ECU 60. In the ECU 60, determination is made as to whether or not the PUH device 20 should be actuated based on the input collision signal. When determination is made that the PUH device 20 should be actuated, an actuation signal is output from the ECU 60 to the actuator 30. The squib of the MGG 42 of the actuator 30 is thereby ignited, and gas is supplied to the inside of the rod 40.

When gas is supplied to the inside of the rod 40, the cylinder 32 is pressed by the pressure of the gas inside the rod 40, and the cylinder 32 rises in the axial direction of the rod 40. The cylinder 32 accordingly lifts the rear end portion 28R of the second arm 28, and both respective vehicle width direction end portions of the rear end section 10R of the front hood 10 are lifted to the lifted position (see the front hood 10 illustrated by solid lines in FIG. 7). Note that when this is performed, the shear pin joining between the second arm 28 and the first arm 26 snaps, and the second arm 28 swings toward the upper side (the arrow C direction side in FIG. 2) relative to the first arm 26, and the first arm 26 swings toward the upper side (the arrow A direction side in FIG. 2) relative to the hinge base 24. The front hood 10 is thereby lifted to the lifted position. Moreover, when this is performed, the oscillation suppressing mechanism 50 switches from the stowed state to the actuated state, and movement of the second arm 28 toward the upper side with respect to the hinge base 24 is restricted.

Figure 9:
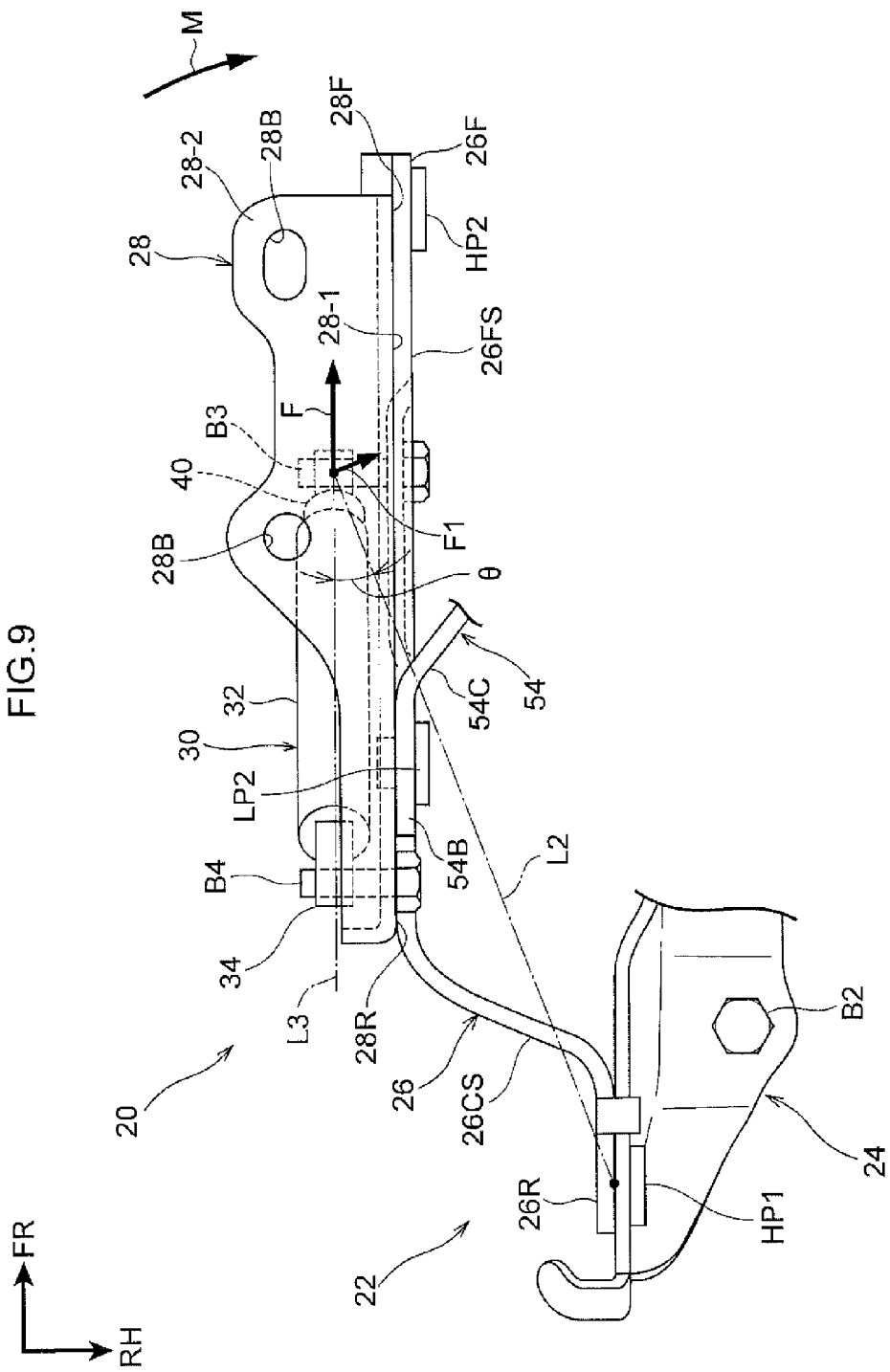
FIG. 9 is a plan view illustrating part of a vehicle pop-up hood device of a comparative example.

Next, explanation follows regarding a relationship between actuation load from the actuator 30 that acts on the first arm 26 during actuation of the actuator 30, and flexure of the second arm 28, drawing comparison with a comparative example illustrated in FIG. 9. As illustrated in FIG. 9, in the comparative example, the front side inclined wall 26FS of a first arm is disposed with a plate thickness direction in the vehicle width direction. In other words, the front side inclined wall 26FS extends along the front-rear direction in vehicle plan view. Moreover, in the comparative example, due to the placement of the front side inclined wall 26FS, the second arm 28 and the actuator 30 also extend along the front-rear direction in vehicle plan view. Note that the respective components illustrated in FIG. 9 are allocated the same reference numerals as those used in the present exemplary embodiment.

Moreover, the first coupling bolt B3 and the second hinge pin HP2 are disposed at the front side and at the vehicle width direction inner side of the first hinge pin HP1. Namely, in the first arm 26, in vehicle plan view, the first coupling bolt B3, this being the point of action where actuation load F of the actuator 30 acts on the first arm 26, is disposed at the front side and vehicle width direction inner side of the first hinge pin HP1, this being the swing pivot point of the first arm 26. Accordingly, in vehicle plan view, an imaginary line L2 connecting between the swing pivot point of the first arm 26 (a portion coupled by the first hinge pin HP1) and the point of action of the first arm 26 (the portion coupled to the actuator 30 by the first coupling bolt B3) is inclined toward the vehicle width direction inner side on progression toward the front side.

The actuation load F of the actuator 30 input to the first coupling bolt B3 acts in a direction along an axial line L3 of the actuator 30. Namely, the actuation load F acts toward the front side in the first coupling bolt B3 in vehicle plan view. Since the direction of the actuation load F intersects the imaginary line L2, a component force F1 of the actuation load F orthogonal to and toward the vehicle width direction outer side of the imaginary line L2 acts at the location of the first coupling bolt B3 in the first arm 26. Accordingly, a clockwise rotation moment M (see the arrow M in FIG. 9) centered on the first hinge pin HP1 acts on the first arm 26, and the first arm 26 undergoes flexural deformation so as to displace the front end portion 26F of the first arm 26 toward the vehicle width direction outer side. As a result, there is a possibility of being unable to lift the front hood 10 as desired with the first arm 26 and the second arm 28.

By contrast, in the present exemplary embodiment, as illustrated in FIG. 1, in vehicle plan view, the actuator 30 is disposed at an incline toward the vehicle width direction inner side on progression toward the front side. Similarly to as described above, the actuation load F of the actuator 30 input to the first coupling bolt B3 acts in a direction along the axial line L3 of the actuator 30. Accordingly, in vehicle plan view, the actuation load F acts on the first coupling bolt B3 in a direction inclined toward the vehicle width direction inner side on progression toward the front side. In vehicle plan view, the direction in which the actuation load F acts can thereby be brought closer to being parallel with the imaginary line L2 connecting between the swing pivot point of the first arm 26 (the first hinge pin HP1) and the point of action (the first coupling bolt B3). In other words, an angle θ (angle of intersection) formed between the axial line L3 of the actuator 30 and the imaginary line L2 can be made smaller than in the comparative example. Accordingly, the component force F1 of the actuation load F orthogonal to and toward the vehicle width direction outer side of the imaginary line L2 can be reduced compared to in the comparative example. As a result, the clockwise rotation moment M centered on the first hinge pin HP1 can be suppressed from arising in the first arm 26 (the rotation moment M arising in the first arm 26 can be reduced), thereby enabling flexural deformation of the first arm 26 to be suppressed.

Moreover, the respective axial lines of the first coupling bolt B3, the second coupling bolt B4, and the second hinge pin HP2 are orthogonal to the actuator 30. Namely, the respective axial lines of the first coupling bolt B3, the second coupling bolt B4, and the second hinge pin HP2 are disposed parallel to each other in vehicle plan view, and are orthogonal to the actuator 30. The actuation load from the actuator 30 acting on the first coupling bolt B3 and the second coupling bolt B4 accordingly acts in a direction orthogonal to the axial direction of the second hinge pin HP2, thereby enabling the second arm 28 to be swung as desired relative to the first arm 26. This thereby enables the front hood 10 to be lifted as desired.

In vehicle plan view, the hinge bolts B1 that fix the second arm 28 to the front hood 10 are disposed in a row in the front-rear direction, corresponding to the extension direction of the second arm 28. In other words, the hinge bolt B1 disposed at the front side is disposed at the vehicle width direction inner side of the hinge bolt B1 disposed at the rear side. This thereby enables a projection amount of the upper wall portion 28-2 of the second arm 28 to be suppressed from becoming large. Accordingly, an increase in size of the second arm 28 can be suppressed, thereby enabling an increase in size of the PUH device 20 to be suppressed.

Next, with reference to FIG. 10A to FIG. 10D, explanation follows regarding a relationship between behavior of the front hood 10, and the state of the oscillation suppressing mechanism 50 and the state of the actuator 30, when both vehicle width direction end portions of the rear end section 10R of the front hood 10 have been lifted by the actuators 30. Note that FIG. 10A to FIG. 10D schematically illustrate states of the front hood 10 in time sequence when the actuator 30 lifts the front hood 10, as viewed from the rear side. Both vehicle width direction end portions of the front hood 10 are indicated by hollow circles.

Figure 10A:
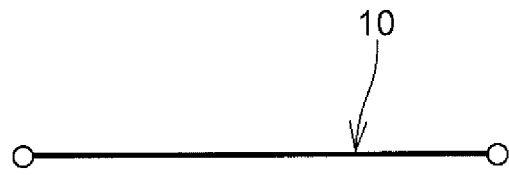
FIG. 10A is an explanatory diagram to explain behavior of a hood when a vehicle pop-up hood device of the present exemplary embodiment is actuated, and is an explanatory diagram illustrating an example of a state prior to actuators lifting a front hood.
Figure 10B:
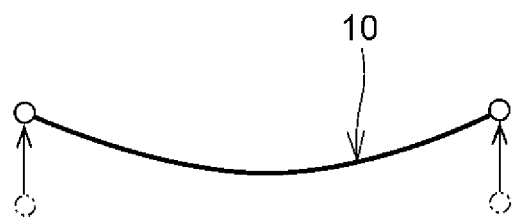
FIG. 10B is an explanatory diagram to explain behavior of a hood when a vehicle pop-up hood device of the present exemplary embodiment is actuated, and is an explanatory diagram illustrating an example of a state in which only both vehicle width direction end portions of a front hood have been lifted in an initial lifting stage of a front hood by the actuators.

FIG. 10A illustrates a state prior to the actuator 30 lifting the front hood 10. In this state, the actuator 30 is in the non-actuated state illustrated in FIG. 5, and the oscillation suppressing mechanism 50 is in the stowed state illustrated in FIG. 2.

When actuation of the actuator 30 begins, as illustrated in FIG. 6, the cylinder 32 rises instantaneously with respect to the rod 40, and the front hood 10 is lifted to the lifted position. When this is performed, the gas escape holes 32A of the cylinder 32 are disposed further to the upper end side of the actuator 30 than the O-ring 46 of the rod 40. Accordingly, the gas in the inner side of the rod 40 is discharged through the gas escape holes 32A to outside the actuator 30. Lifting of the front hood 10 by the actuator 30 accordingly ceases. Moreover, in this state, the lock ring 38 that rises together with the cylinder 32 is disposed between the lower end portion of the retention groove 40D of the rod 40 and the housing groove 36A of the cylinder 32.

When the actuator 30 is actuated and lifts the front hood 10 to the lifted position, the oscillation suppressing mechanism 50 switches from the stowed state to the actuated state (switches from the state illustrated in FIG. 2 to the state illustrated in FIG. 3). In the actuated state of the oscillation suppressing mechanism 50, the slot 52E of the displacement mechanism 58 is disposed so as to extend from the coupling hole 52D toward the upper side. Note that in the oscillation suppressing mechanism 50, the diameter dimension of the shaft portion 56A of the link shaft 56 coupling the first link 52 and the second link 54 together is set larger than the width dimension of the slot 52E, and so the link shaft 56 is retained inside the coupling hole 52D in the actuated state of the oscillation suppressing mechanism 50. Namely, displacement of the second arm 28 toward the upper side with respect to the hinge base 24 is restricted by the oscillation suppressing mechanism 50, and displacement of both respective vehicle width direction end portions of the rear end section 10R of the front hood 10 toward the upper side is restricted.

When both vehicle width direction end portions of the rear end section 10R of the front hood 10 are lifted by the actuators 30, the vehicle width direction central portion of the front hood 10 attempts to remain at its initial position due to inertia. Accordingly, during initial lifting of the front hood 10 by the actuators 30, only both vehicle width direction end portions of the front hood 10 are lifted (see the state in FIG. 10B). The vehicle width direction central portion of the front hood 10 is then displaced toward the upper side later than both vehicle width direction end portions of the front hood 10 (see the arrow illustrated in FIG. 10C). Since displacement of the vehicle width direction central portion of the front hood 10 in the up-down direction is not restricted, the vehicle width direction central portion of the front hood 10 undergoing displacement toward the upper side is displaced (overshoots) further toward the upper side than the lifted position due to inertia (see the state in FIG. 10C). Accordingly, during lifting of the front hood 10, the front hood 10 attempts to exhibit simple harmonic oscillation, with an antinode at the vehicle width direction central portion of the front hood 10, and with nodes at both vehicle width direction end portions of the front hood 10, as viewed from the rear side.

When the vehicle width direction central portion of the front hood 10 overshoots further to the upper side than the lifted position, the specific load toward the upper side from the front hood 10 acts on the other end portion (the other end portion 54B of the second link 54) of the oscillation suppressing mechanism 50 via the second arm 28. The displacement mechanism 58 of the oscillation suppressing mechanism 50 is thereby actuated. Specifically, the swingably supported state of the link shaft 56 by the coupling hole 52D is released, and the link shaft 56 moves toward the upper side relative to the first link 52, while sliding against the inner peripheral faces of the slot 52E (switches from the state illustrated in FIG. 3 to the state illustrated in FIG. 4). The second arm 28 accordingly swings toward the upper side with respect to the first arm 26 and is displaced toward the upper side with respect to the hinge base 24, and the other end portion of the oscillation suppressing mechanism 50 is displaced to the upper limit position together with both respective vehicle width direction end portions of the front hood 10.

Figure 10C:
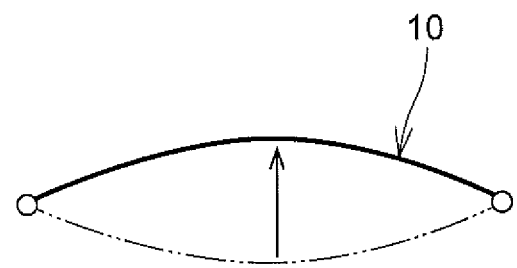
FIG. 10C is an explanatory diagram to explain behavior of a hood when a vehicle pop-up hood device of the present exemplary embodiment is actuated, and is an explanatory diagram illustrating an example of a state in which a vehicle width direction central portion of a front hood has been displaced toward an upper side later than both vehicle width direction end portions of the front hood.
Figure 10D:
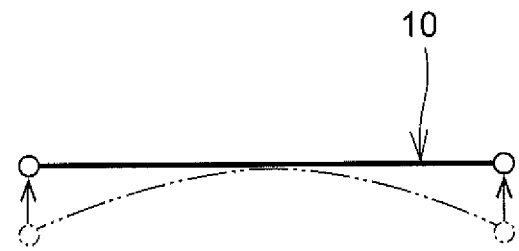
FIG. 10D is an explanatory diagram to explain behavior of a hood when a vehicle pop-up hood device of the present exemplary embodiment is actuated, and is an explanatory diagram illustrating an example of a state in which both vehicle width direction end portions of a front hood have been displaced to an upper limit position.

More detailed explanation follows, with reference to FIG. 10C and FIG. 10D. When the vehicle width direction central portion of the front hood 10 reaches the upper dead center or the vicinity of the upper dead center, both vehicle width direction end portions of the front hood 10 are displaced to the upper limit position (adopt the state in FIG. 10D from the state in FIG. 10C). As a result, as viewed from the rear side, both vehicle width direction end portions of the front hood 10 open up such that the front hood 10 becomes substantially horizontal. Accordingly, oscillation arising in the front hood 10 by overshooting is attenuated at an early stage.

Figure 4:
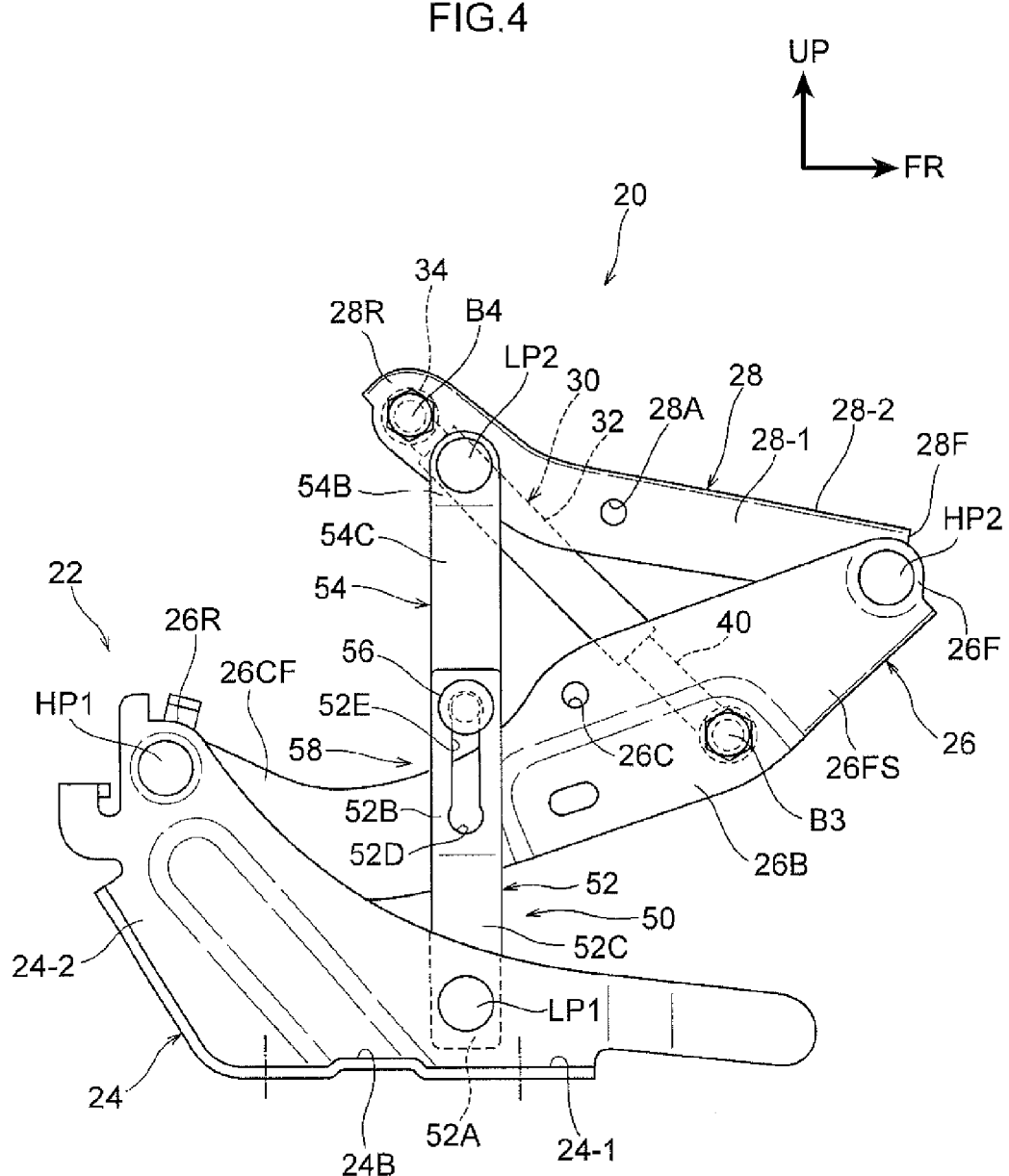
FIG. 4 is a side view illustrating a displacement mechanism of an oscillation suppressing mechanism of the vehicle pop-up hood device illustrated in FIG. 3, in a state following actuation.

Then, when both respective vehicle width direction end portions of the front hood 10 have been displaced to the upper limit position, the link shaft 56 of the oscillation suppressing mechanism 50 is retained in the retention groove 40D (see FIG. 4). Both vehicle width direction end portions of the front hood 10 are thereby retained at the upper limit position in a state in which oscillation of the front hood 10 is suppressed. Note that when the other end portion of the oscillation suppressing mechanism 50 is displaced from the lifted position to the upper limit position, the cylinder 32 of the actuator 30 also rises further toward the upper limit position with respect to the rod 40. Namely, the lock ring 38 moves from the lower end portion of the retention groove 40D toward the upper end portion of the retention groove 40D while sliding against the bottom face 40D1 (the cylinder 32 rises further with respect to the rod 40 from the state illustrated in FIG. 6).

Due to the above, in the PUH device 20, when the actuator 30 actuates and the front hood 10 is lifted to the lifted position, the oscillation suppressing mechanism 50 switches from the stowed state to the actuated state, and movement (displacement) of the second arm 28 toward the upper side with respect to the hinge base 24 is limited by the oscillation suppressing mechanism 50. Namely, the second arm 28 is coupled to the hinge base 24 that is fixed to a high rigidity location of the vehicle body via the oscillation suppressing mechanism 50, thereby enabling movement of the second arm 28 toward the upper side with respect to the hinge base 24 to be restricted. This thereby enables wobbling of both vehicle width direction end portions of the front hood 10 when popping up is completed to be suppressed in comparison to a hypothetical case in which the oscillation suppressing mechanism 50 is omitted from the PUH device 20. This thereby enables oscillation of the front hood 10 when popping up is completed to be suppressed.

Moreover, in the present exemplary embodiment, the actuator 30 is disposed at an incline toward the vehicle width direction inner side on progression toward the front side in vehicle plan view, and the axial line of the second hinge pin HP2 is orthogonal to the actuator 30 in vehicle plan view. Namely, the axial line of the second hinge pin HP2 is inclined toward the rear side on progression toward the vehicle width direction inner side in vehicle plan view. Accordingly, when the second arm 28 swings about the axis of the second hinge pin HP2 and lifts the vehicle width direction outer side end portion of the rear section of the front hood 10, (a fastening and fixing portion to the front hood 10 of) the second arm 28 is displaced toward the front side and the vehicle width direction inner side in vehicle plan view (see the arrow G in FIG. 8). The front hood 10 accordingly flexes such that both vehicle width direction end portions of the rear end section 10R of the front hood 10 are displaced toward the vehicle width direction central side by the second arm 28. Oscillation energy of the front hood 10 arising when the front hood 10 is lifted is expended in flexural deformation of the front hood 10, thereby enabling oscillation of the front hood 10 to be further suppressed.

The oscillation suppressing mechanism 50 is disposed between the front side inclined wall 26FS of the first arm 26 and the second arm 28, and the hinge base 24 (namely, in the housing area CA). The housing area CA is thereby effectively utilized since the oscillation suppressing mechanism 50 that suppresses oscillation of the front hood 10 can be disposed in the housing area CA.

At the lifted position, the hinge base 24 and the second arm 28 are coupled together by the oscillation suppressing mechanism 50 that has switched to the actuated state. This thereby enables the front hood 10 to be suppressed from retreating toward the rear side when a collided-with body contacts the front hood 10 that has popped up.

The oscillation suppressing mechanism 50 is configured by the link mechanism including the first link 52 and the second link 54, and the first link 52 and the second link 54 are coupled together by the link shaft 56. This thereby enables the oscillation suppressing mechanism 50 to be switched from the stowed state to the actuated state using a simple configuration, corresponding to a swing mode of the first arm 26 and the second arm 28.

The displacement mechanism 58 configured by the link shaft 56 and the slot 52E actuates when the vehicle width direction central portion of the rear end section 10R of the front hood 10 overshoots further to the upper side than the lifted position, and the specific load toward the upper side from the front hood 10 acts on the other end portion of the oscillation suppressing mechanism 50 (second link 54). Both vehicle width direction end portions of the front hood 10 are thereby permitted to move (displace) to the upper limit position that is further to the upper side than the lifted position. Accordingly, as described above, oscillation of the front hood 10 arising due to the vehicle width direction central portion overshooting toward the upper side can be attenuated at an early stage.

In the displacement mechanism 58 of the oscillation suppressing mechanism 50, the diameter dimension of the shaft portion 56A of the link shaft 56 is set larger than the width dimension of the slot 52E. Accordingly, during actuation of the displacement mechanism 58, the (shaft portion 56A of the) link shaft 56 moves from the coupling hole 52D toward the retention hole 52F while sliding against the inner peripheral faces of the slot 52E. This thereby enables oscillation energy of the front hood 10 to be absorbed by frictional force arising between the link shaft 56 and the slot 52E during actuation of the displacement mechanism 58. The oscillation attenuation effect of the displacement mechanism 58 can accordingly be enhanced.

The displacement mechanism 58 includes the retention hole 52F formed at the other end portion of the slot 52E. At the upper limit position, the link shaft 56 is retained by the retention hole 52F. This thereby enables the front hood 10 to be retained at the upper limit position in a state in which oscillation of the front hood 10 is suppressed.

Figure 11:
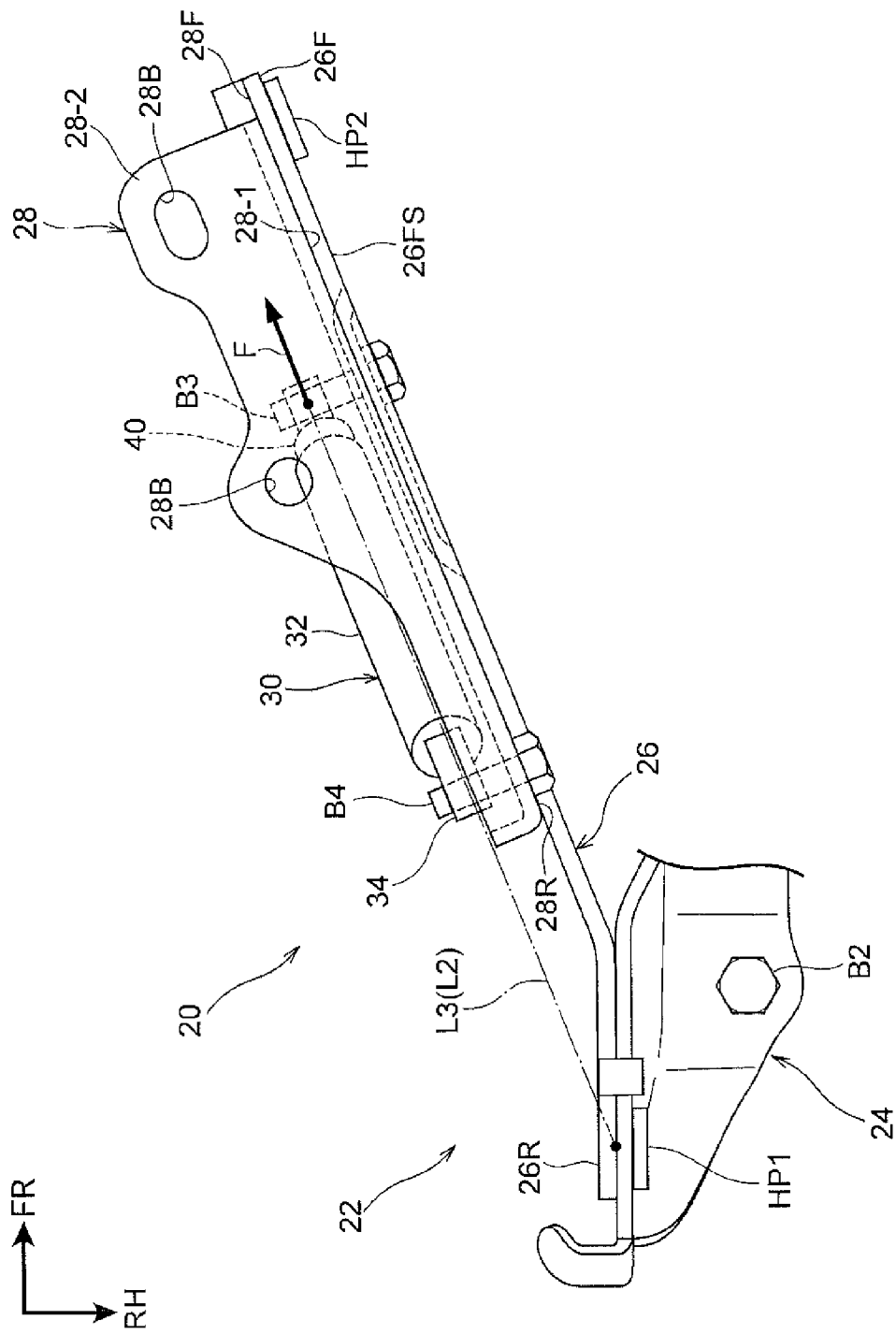
FIG. 11 is a plan view illustrating a modified example of a first arm illustrated in FIG. 1.

In the present exemplary embodiment, the imaginary line L2 connecting between the swing pivot point and the point of action of the first arm 26, and the axial line L3 of the actuator 30 are configured so as to intersect each other in vehicle plan view. However, configuration may be made such that the imaginary line L2 and the axial line L3 of the actuator 30 are aligned in vehicle plan view. For example, in FIG. 11 the intermediate inclined wall 26CS of the first arm 26 is omitted, and the front side inclined wall 26FS extends from a front end of the rear end wall 26R of the first arm 26 toward the vehicle width direction inner side on progression toward the front side. The angle of inclination, the position, and the like of the front side inclined wall 26FS may be modified as appropriate such that the axial line L3 of the actuator 30 and the imaginary line L2 are aligned with each other. In such cases, since the imaginary line L2 and the axial line L3 of the actuator 30 are aligned with each other, the actuation load F from the actuator 30 can be made to act along the imaginary line L2. This thereby enables rotation moment arising in the first arm 26 during actuation of the actuator 30 to be further suppressed, and enables flexural deformation of the first arm 26 to be further suppressed.

In the present exemplary embodiment, the hinge bolts B1 for fixing the second arm 28 to the front hood 10 are disposed in a row along the front-rear direction so as to follow the extension direction of the second arm 28 in vehicle plan view. Namely, the hinge bolt B1 disposed at the front side is disposed at the vehicle width direction inner side of the hinge bolt B1 disposed at the rear side; however, the positions of the hinge bolts B1 in the vehicle width direction may be modified as appropriate. For example, the positions of the vehicle width direction positions of the hinge bolt B1 disposed at the front side and the hinge bolt B1 disposed at the rear side may be aligned with each other in the vehicle width direction.

From the perspective of attenuating oscillation of the front hood 10 that has been lifted to the lifted position at an early stage, the oscillation suppressing mechanism 50 is preferably provided with the displacement mechanism 58, as in the present exemplary embodiment. However, depending on the type of vehicle, for example, in configurations in which the bending rigidity of the front hood 10 is comparatively high, the overshoot of the front hood 10 when both vehicle width direction end portions of the front hood 10 are lifted by the actuators 30 is comparatively small. In vehicles with such a front hood 10, the displacement mechanism 58 may therefore be omitted from the oscillation suppressing mechanism 50. Namely, the slot 52E of the first link 52 may be omitted.

In the present exemplary embodiment, explanation has been given regarding an example in which the actuator 30 and the oscillation suppressing mechanism 50 are respectively disposed at the vehicle width direction inner side and the vehicle width direction outer side of the first arm 26 and the second arm 28. However, the placement of the actuator 30 and the oscillation suppressing mechanism 50 is not limited thereto. For example, the actuator 30 and the oscillation suppressing mechanism 50 may both be disposed at the vehicle width direction outer side of the first arm 26 and the second arm 28, or may both be disposed at the vehicle width direction inner side of the first arm 26 and the second arm 28. The placement of the actuator 30 and the oscillation suppressing mechanism 50 may accordingly be set as appropriate in consideration of, for example, the clearance from other members peripheral to the hood hinge 22.

The present exemplary embodiment describes the PUH device 20; however, a vehicle pop-up hood device of the present disclosure is not limited to the above, and obviously various other modifications may be implemented within a range not departing from the spirit of the present disclosure.

All cited documents, patent applications, and technical standards mentioned in the present specification are incorporated by reference in the present specification to the same extent as if the individual cited document, patent application, or technical standard was specifically and individually indicated to be incorporated by reference.

What is claimed is:

1. A vehicle pop-up hood device, comprising:
a hinge base that is fixed to a vehicle body;
a first arm that is disposed at a vehicle width direction inner side of the hinge base, and that is coupled to the hinge base, so as to be capable of swinging, via a first pin having an axial direction in the vehicle width direction;
a second arm that is disposed at the vehicle width direction inner side of the first arm, that is fixed to a vehicle width direction outer side end portion of a rear section of a hood, that is coupled to the first arm via a second pin so as to be capable of swinging, and that moves the vehicle width direction outer side end portion of the rear section of the hood toward a vehicle upper side by swinging with respect to the first arm; and
an actuator that is coupled to the first arm via a first coupling shaft and that is coupled to the second arm via a second coupling shaft disposed at a vehicle rear side of the first coupling shaft, actuation of the actuator causing the second arm to be swung with respect to the first arm, whereby the hood is lifted from a closed position to a lifted position, wherein:
the first coupling shaft, the second coupling shaft, and the second pin are disposed at a vehicle front side and at the vehicle width direction inner side with respect to the first pin, and
the actuator is disposed at an incline toward the vehicle width direction inner side on progression toward the vehicle front side in vehicle plan view, and respective axial lines of the first coupling shaft, the second coupling shaft, and the second pin are orthogonal to the actuator in vehicle plan view.

2. The vehicle pop-up hood device of claim 1, wherein:
the second arm extends along the actuator in plan view, and is fixed to the hood by a pair of front and rear fastening members; and
among the pair of front and rear fastening members, a fastening member disposed at the vehicle front side is disposed at the vehicle width direction inner side with respect to a fastening member disposed toward the vehicle rear side.

3. The vehicle pop-up hood device of claim 1, further comprising an oscillation suppressing mechanism that couples the hinge base and the second arm together and that suppresses oscillation of the hood when the actuation of the actuator completes, wherein the oscillation suppressing mechanism is disposed between the second arm and the hinge base in the vehicle width direction.

* * * * *